United States Patent [19]
Kim et al.

[11] Patent Number: 6,160,062
[45] Date of Patent: Dec. 12, 2000

[54] POLYMER FOR PHOTOSENSITIVE RESIN COMPOSITION AND METHOD FOR MAKING THE SAME

[75] Inventors: Chang-wook Kim; Eak-Cheol Eam; Seung-Jun You, all of Kyonggi-do; Eun-Ha Hu, Seoul; Gi-Wook Kang, Kyonggi-do, all of Rep. of Korea

[73] Assignee: Samsung Display Devices Co., Ltd., Rep. of Korea

[21] Appl. No.: 09/231,314

[22] Filed: Jan. 13, 1999

[30] Foreign Application Priority Data

May 14, 1998 [KR] Rep. of Korea ............... 98-17368

[51] Int. Cl.[7] .................................................. G08F 226/02
[52] U.S. Cl. ..................... 526/87; 526/80; 526/279; 526/307.1; 526/307.2; 430/28
[58] Field of Search ............... 526/80, 87, 303.1, 526/307.1, 307.2, 279; 430/28

[56] References Cited

U.S. PATENT DOCUMENTS

| | | | |
|---|---|---|---|
| 4,154,910 | 5/1979 | Tanaka et al. | 526/307.2 |
| 4,521,580 | 6/1985 | Turner et al. | 526/307.2 |
| 5,725,978 | 3/1998 | Miyazawa et al. | 430/26 |
| 6,020,093 | 2/2000 | Shibuya et al. | 430/7 |

*Primary Examiner*—John S. Chu
*Attorney, Agent, or Firm*—Baker & McKenzie

[57] ABSTRACT

A PDMA polymer for a photosensitive resin composition. The PDMA polymer is obtained by polymerizing an acrylamide, N,N-dimetylacrylamide monomer, and a vinyl-type silane. The PDMA polymer having a molecular weight of 1,000,000~2,000,000 and having a formula as follows:

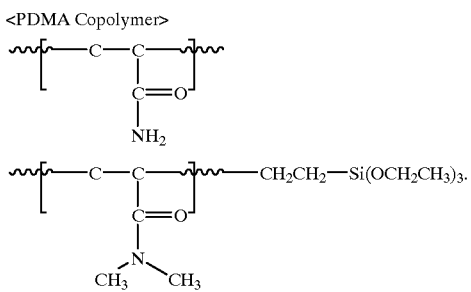

7 Claims, No Drawings

POLYMER FOR PHOTOSENSITIVE RESIN COMPOSITION AND METHOD FOR MAKING THE SAME

BACKGROUND OF THE INVENTION

1. Field of the Invention

The present invention relates to a polymer for a photosensitive resin composition used as a phosphor slurry for forming a phosphor layer of a color picture tube, and more particularly, to a polymer which can enhance adhesive strength of a photosensitive resin composition, to which a diazo-type photosensitive material as a nonchrome-type photosensitive material is added, so that a phosphor material can be stably attached on a surface of a panel.

2. Description of the Prior Art

Generally, a phosphor layer is formed on an inner surface of a panel for a color picture tube by (a) depositing a phosphor slurry consisting of a phosphor material and a photosensitive resin on the inner surface of the panel, (b) exposing the deposited slurry to a light and (c) cleaning out an exposed or unexposed portion of the deposited slurry. To fixedly form the phosphor layer on the panel, the phosphor slurry is not varied in its properties of matter while having an affinity for the panel and depositing properties.

As a conventional phosphor slurry, a phosphor suspension, which is made by suspending a phosphor material in a liquid made by mixing sodium dichromate as a photosensitive material with a polyvinyl alcohol aqueous solution as a polymer, has been used. However, since chrome contained in a waste sodium dichromate contaminates soil, alternative materials have been developed.

A polyvinyl alcohol-sodium dichromate type, a polyvinyl alcohol-sodium dichromate-diazo type, and a polyvinyl alcohol-azido type photosensitive material are well-known as photosensitive resin compositions used for the phosphor slurry.

Among the photosensitive resin compositions, the polyvinyl alcohol-sodium dichromate type is mostly used as it is highly sensitive. However, when forming the phosphor layer using this composition, it is very difficult to adjust a width of dots.

In addition, when storing the polyvinyl alcohol-sodium dichromate type for a long time, a dark reaction occurs between a polyvinyl alcohol and a sodium dichromate, in which $Cr^{+6}$ of the sodium dichromate is reduced into $Cr^{+3}$ by an oxidation-reduction reaction. Particularly, the chrome contained in the waste sodium dichromate still contaminates the soil.

The polyvinyl alcohol-sodium dichromate-diazo type enhances sensitivity of the polyvinyl alcohol-sodium dichromate type, thereby reducing the light exposing time. However, it also contains the chrome which contaminates the soil.

The polyvinyl alcohol-azido type photosensitive material has good developing properties, but low adhesive strength, not stably attaching the phosphor material on the inner surface of the panel. Therefore, the polyvinyl alcohol-azido type photosensitive material is used only for forming a black matrix of the color picture tube.

In addition a diazo-type photosensitive material is well known as a nonchrome-type photosensitive material. However, this material has a drawback in that when mixed with a polyvinyl alcohol, the photosensitivity is quickly reduced.

SUMMARY OF THE INVENTION

Therefore, it is an objective of the present invention to provide a polymer for a photosensitive resin composition, which does not deteriorate in a photosensitivity even when used together with a nonchrome diazo-type photosensitive material that does not contaminate the soil.

It is another objective of the present invention to provide a polymer for a photosensitive resin composition, which can enhance adhesive strength of a phosphor material so that the same can be stably attached on a surface of a panel.

To achieve the above objectives, the present invention provides a PDMA polymer(polymer of acrylamide with N,N-dimethyl acrylamide) for a photosensitive resin composition. The PDMA polymer is attained by polymerizing an acrylamide, N,N-dimethyl acrylamide monomer, and a vinyl-type silane. The PDMA polymer has a molecular weight of 1,000,000~2,000,000 having a formula as follows:

Chemical Formula

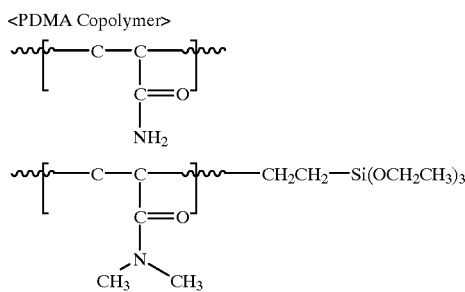

As the vinyl-type silane compound, a vinyltris(2-methoxy ethoxy)silane may be used.

According to another aspect, the present invention provides a method for making a PDMA polymer for a photosensitive resin composition, comprising the steps of adding an acrylamide monomer and an N,N-dimethyl acrylamide monomer to pure water and dissolving the same through an agitating process, thereby obtaining a first mixture, deoxygenating the first mixture while injecting a nitrogen for 30 minutes, increasing a temperature to 55° C. by 1° C./min, adding an AIBN-type starting material into the mixture so that a polymerizing reaction occurs, and adding a vinyl-type silane into the mixture during the polymerizing reaction.

Preferably, the polymerizing reaction is continued for three hours.

Preferably, a weight of the acrylamide monomer is about 30 weight per total, a weight of the N,N-dimethylacrylamide monomer is about 20 weight per total, and a weight of the pure water is about 929 weight per total. A weight of the AIBN-type starting material is about 25 weight per total.

Preferably, as the AIBN-type starting material, an azobis-iso-butyronitrile may be used.

DETAILED DESCRIPTION OF PREFERRED EMBODIMENT

A preferred embodiment of the present invention will now be described in detail with reference to the following example.

EXAMPLE 30 g of an acrylamide monomer and 20 g of N,N-dimethylacrylamide monomer were added to 929 g of pure water and dissolved through an agitating process, thereby obtaining a mixture. Next, the mixture was deoxygenated by injecting a nitrogen for 30 minutes. After increasing a temperature to 55° C. by 1° C./min, 25 g of an azobis-iso-butyronitrile was added to the mixture so that a polymerizing reaction occurred. Here, during the polymerizing reaction, a small amount of a vinyltris(2-methoxyethoxy) silane was added. After the polymerizing reaction was continued for three hours at a temperature of 55° C. the mixture was naturally cooled, thereby obtaining a PDMA water-soluble polymer. A chemical reaction embodying above features has the following structure:
Chemical Reaction

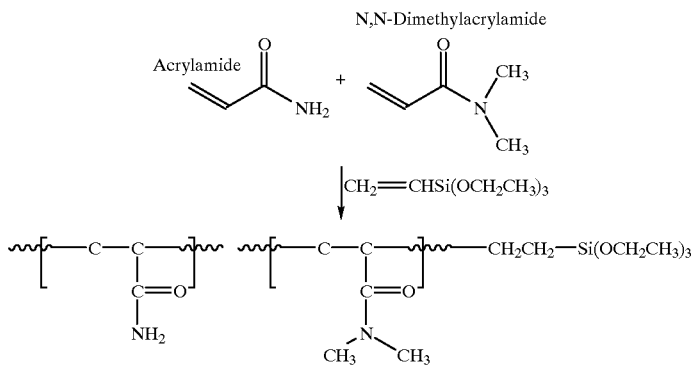

If the polymerizing reaction time was above 3 hours, it has been noted that the polymerization deteriorated, changing physical properties. In addition, if the temperature for the reaction was lower than 55° C., there were some problems in the polymerizing reaction, and if higher than 55° C. viscosity of the polymer degraded.

A phosphor slurry was attained by adding a diazo-photosensitive material and a phosphor material into the polymer obtained above and by dissolving the same in pure water.

When examining a phosphor layer which was formed by depositing the phosphor slurry on a surface of a color picture tube panel, it has been noted that the attaching state of the phosphor material on the panel was very excellent. In addition, the adjustment of width of dots could easily be realized.

As the diazo-photosensitive material used for making the above described phosphor slurry, a benzene diazonium-4-penylamino-sulfate(1:1) polymer dissolved in a para-formaldehyde, to which a 1/2-xinc chloride was added, was used. This photosensitive material is a nonchrome-type photosensitive material which has excellent adhesive strength with respect to a surface of a glass. In addition, as a surfactant and an adhesive reenforcing material, a polyoxy propylene and a polyoxy ethylene polymer (PES) or a polyoxy ethylene sorbitan mono laurate can be used.

Particularly, it its preferably to add the polyoxy ethylene polymer into the phosphor slurry to increase dispersibility by reducing moisture and surface tension of the phosphor layer.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A method for making a PDMA polymer for a photosensitive resin composition, comprising the steps of:
adding an acrylamide monomer and an N,N-dimethylacrylamide monomer to pure water and dissolving the same through an agitating process, thereby obtaining a first mixture;
deoxygenating the first mixture while injecting a nitrogen for 30 minutes;
increasing a temperature to 55° C. by 1° C./min;
adding an AIBN-type starting material into the mixture so that a polymerizing reaction occurs; and
adding a vinyl silane into the mixture during the polymerizing reaction.

2. The method claim 1 wherein the vinyl silane comprises a vinyltris(2-methoxyethoxy)silane.

3. The method of claim 1 wherein the polymerizing reaction is continued for three hours.

4. The method of claim 1 wherein a weight of the acrylamide monomer is about 30 weight per total, a weight of the N,N-dimethylacrylamide monomer is about 20 weight per total, and a weight of the pure water is about 929 weight per total.

5. The method of claim 1 wherein a weight of the AIBN-type starting material is about 25 weight per total.

6. The method of making a PDMA polymer for a photosensitive resin composition according to claim 3, further including producing a PDMA polymer having a molecular weight of 1,000,000~2,000,000 and having a formula as follows:

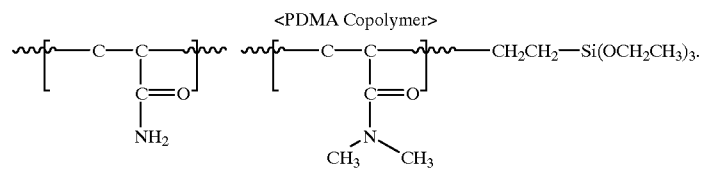

7. The method of making a PDMA polymer of claim 6 wherein the PDMA polymer is produced by polymerizing an acrylamide, N,N-dimethyl acrylamide monomer, and a vinyltris(ethoxymethoxy).

* * * * *